United States Patent [19]
Pazdirek et al.

[11] Patent Number: 5,713,689
[45] Date of Patent: Feb. 3, 1998

[54] BALL JOINT LINK

[75] Inventors: Jiri Pazdirek, Schaumburg; Ernst M. Gaertner, Wheeling, both of Ill.

[73] Assignee: MacLean-Fogg Company, Wheeling, Ill.

[21] Appl. No.: 631,443

[22] Filed: Apr. 12, 1996

[51] Int. Cl.⁶ ........................................ F16C 11/00
[52] U.S. Cl. ........................ 403/135; 403/133; 403/134
[58] Field of Search ........................ 403/122, 132, 403/133, 134, 135, 137, 140, 143

[56] References Cited

U.S. PATENT DOCUMENTS

| | | |
|---|---|---|
| 1,762,541 | 6/1930 | Blowers .................. 403/135 X |
| 1,909,430 | 5/1933 | Skillman . |
| 1,943,631 | 1/1934 | Skillman . |
| 2,027,560 | 1/1936 | Skillman . |
| 2,440,144 | 4/1948 | Hosking . |
| 2,954,992 | 10/1960 | Baker . |
| 2,976,093 | 3/1961 | Reiling . |
| 3,001,900 | 9/1961 | Frieder et al. . |
| 3,011,219 | 12/1961 | Williams . |
| 3,094,376 | 6/1963 | Thomas . |
| 3,539,210 | 11/1970 | Wehner et al. .................. 403/132 |
| 3,559,265 | 2/1971 | Noris et al. . |
| 3,591,669 | 7/1971 | Memory . |
| 3,650,004 | 3/1972 | Bergstrom . |
| 3,941,495 | 3/1976 | Duncan . |
| 4,290,181 | 9/1981 | Jackson . |
| 4,342,799 | 8/1982 | Schwochert . |
| 4,439,909 | 4/1984 | Borgen et al. . |
| 4,629,352 | 12/1986 | Nemoto . |
| 4,722,631 | 2/1988 | Tagami . |
| 4,758,110 | 7/1988 | Ito .......................... 403/122 X |
| 4,797,019 | 1/1989 | Wood, Jr. .................. 403/135 X |
| 4,887,486 | 12/1989 | Wood, Jr. . |
| 4,903,386 | 2/1990 | Teramachi . |
| 4,904,107 | 2/1990 | Fukukawa et al. .......... 403/140 X |
| 4,954,006 | 9/1990 | Suzuki et al. .............. 403/133 X |
| 4,973,372 | 11/1990 | Ditlinger . |
| 5,009,538 | 4/1991 | Shiral et al. . |
| 5,011,320 | 4/1991 | Love et al. . |
| 5,011,321 | 4/1991 | Kidokoro . |
| 5,061,110 | 10/1991 | Wood, Jr. . |
| 5,078,531 | 1/1992 | Sakai et al. . |
| 5,092,703 | 3/1992 | Kobayashi . |
| 5,140,869 | 8/1992 | Mrdjenovich et al. . |
| 5,150,981 | 9/1992 | Miwa . |
| 5,152,628 | 10/1992 | Broszat . |
| 5,163,769 | 11/1992 | Dresselhouse . |
| 5,165,306 | 11/1992 | Hellon . |
| 5,178,482 | 1/1993 | Wood . |
| 5,267,805 | 12/1993 | Ueno et al. . |
| 5,277,860 | 1/1994 | Sinclair . |
| 5,490,446 | 2/1996 | Engel ...................... 403/140 X |
| 5,609,433 | 3/1997 | Pazdirek et al. . |

FOREIGN PATENT DOCUMENTS

| | | |
|---|---|---|
| 0250063 | 12/1987 | European Pat. Off. . |
| 0411777 | 2/1991 | European Pat. Off. . |
| 2670255 | 6/1992 | France . |
| 3543563C1 | 5/1987 | Germany . |
| 59-062722 | 4/1984 | Japan . |
| 60-151414 | 8/1985 | Japan . |
| 2196690A | 5/1988 | United Kingdom ............ 403/122 |

*Primary Examiner*—Blair Johnson
*Assistant Examiner*—William L. Miller
*Attorney, Agent, or Firm*—Brinks Hofer Gilson & Lione

[57] ABSTRACT

A ball joint link includes a ball stud having a stud and a ball, a cap mounted on the ball, and a rod. The ball defines a raised annular stem which fits inside a tubular portion of the rod such that the ball stud, the cap and the rod form a self-supporting sub-assembly. This sub-assembly is then placed within a mold, and a molded body is formed around the sub-assembly. A strengthening element can be disposed in the molded body around the ball stud to increase pull out resistance.

13 Claims, 1 Drawing Sheet

BALL JOINT LINK

CROSS-REFERENCES TO RELATED APPLICATIONS

U.S. patent application Ser. No. 08/253,688 filed Jun. 3, 1994 and U.S. Pat. No. 5,609,433 issued Mar. 11, 1997 are commonly assigned.

BACKGROUND OF THE INVENTION

This invention relates to improved ball joint links that are light in weight and inexpensive to manufacture, and to methods for forming such links.

Molding techniques in the past have been used in the fabrication of various ball joint components. For example, Duncan U.S. Pat. No. 3,941,495 teaches a method for forming a ball around a stud to form a ball stud.

Sinclair U.S. Pat. No. 5,277,860 discloses an all-plastic rod end in which opposed raceways are mated to form a socket around a ball. The raceways are then overmolded to complete fabrication of the rod end.

Memory U.S. Pat. No. 3,591,669 discloses a plastic universal bearing which is molded in place in a link. In this case, the plastic that forms the socket of the ball joint is integral with the plastic that forms the center section of the link.

Hellon U.S. patent application Ser. No. 08/253,688, filed Jun. 3, 1994 and assigned to the assignee of the present invention, discloses an insert molded ball joint. The ball joint of Hellon includes a housing which is insert molded around three separate parts: a tubular center section of a ball joint link, a ball of a ball stud, and a cap. A high-strength, fiber-reinforced plastic is used for the housing, and the same high-strength material that forms the housing both secures the housing to the center section and forms the bearing surface for the ball. In this way, high pull out forces are required to dislodge the ball stud from the housing.

The present invention differs significantly from the prior art discussed above, particularly with respect to the manner in which the ball stud is retained in the ball joint, the manner in which the ball joint socket is formed, and the manner in which the ball joint is molded.

SUMMARY OF THE INVENTION

According to one aspect of this invention, a ball joint link is provided comprising a ball stud, a cap mounted on the ball stud and comprising a first alignment portion, and a rod comprising a second alignment portion. One of the first and second alignment portions receives and engages the other of the first and second alignment portions to hold the cap and the rod in alignment. A molded body is formed around at least a portion of the ball stud, the cap, and the rod to form a ball joint, with the molded body formed around the first and second alignment portions. Preferably, the cap receives the ball of the ball stud in a snap fit such that the ball stud, the cap, and the rod form a self-supporting sub-assembly prior to the time the molded body is formed. In this way the molding operation is simplified.

According to a second aspect of this invention, a method is provided for forming a ball joint link comprising the step of first positioning a ball joint sub-assembly in a mold. This sub-assembly comprises a ball stud, a cap mounted on the ball of the ball stud, and a rod mounted on the cap. The cap comprises a first alignment portion, the rod comprises a second alignment portion, and one of the first and second alignment portions receives and engages the other of the first and second alignment portions to hold the rod and the cap together. In the next step, a plastic material is injected into the mold around at least a portion of the rod and the cap including the alignment portions to form a ball joint. Preferably the cap is formed to snap fit onto the ball of the ball stud such that the sub-assembly is self-supporting prior to the injecting step.

The following drawings and detailed description provide further information regarding the presently preferred embodiment of this invention.

DETAILED DESCRIPTION OF THE PRESENTLY PREFERRED EMBODIMENTS

Figures 1, 2:
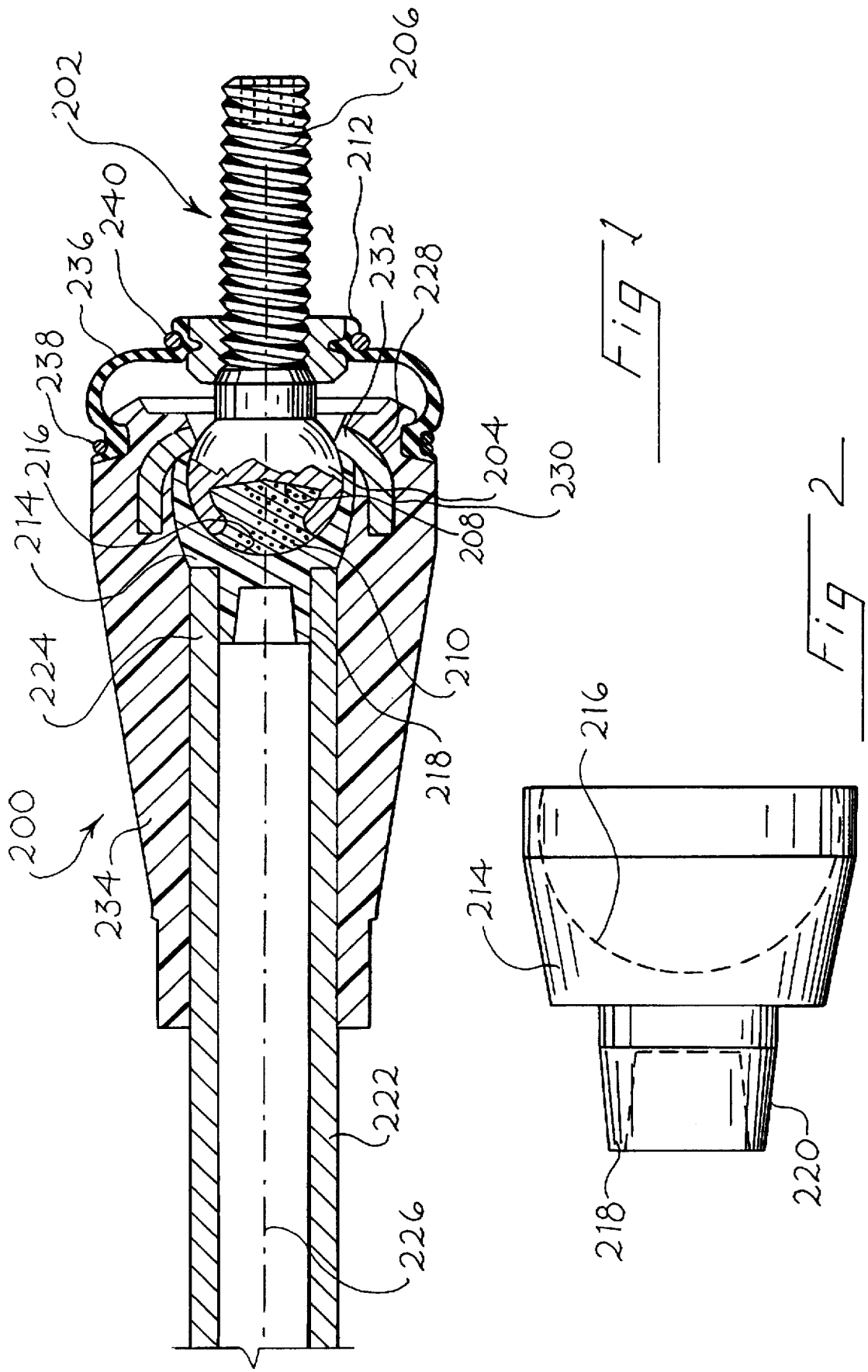
FIG. 1 is a longitudinal sectional view of a ball joint link which incorporates a presently preferred embodiment of this invention.
FIG. 2 is a side view at an enlarged scale of a cap included in the ball joint link of FIG. 1.

Turning now to the drawings, FIG. 1 shows a longitudinal sectional view of a ball joint link 200 which incorporates a presently preferred embodiment of this invention.

The ball joint link 200 includes a ball stud 202 which in this embodiment includes a ball 204 integrally formed with a stud 206. The ball 204 may form a cavity 208, and the cavity may receive a suitable lubricating grease 210. Alternately, the cavity 208 and the grease 210 may be deleted. The stud 206 is threaded and may receive a steel nut 212.

The ball 204 is received in a snap fit in a cap 214. The cap 214 defines a spherical recess 216 at one end, and a protruding annular stem 218 at the other end. As explained below, the annular stem 218 functions as an alignment portion in this embodiment. The recess 216 preferably extends over a surface that is greater than that of a hemisphere of the same diameter.

FIG. 2 shows a side view of the cap 214 prior to assembly. Note that the annular stem 218 provides an external taper 220 in the rest state.

Returning to FIG. 1, the ball joint link 200 also includes a rod 222. FIG. 1 shows only one end of the rod 222, and in practice the other end can be formed as appropriate for the particular application. In many cases the end of the rod 222 not shown in FIG. 1 will mount another ball joint, which may be oriented either parallel to or at right angles to the ball stud 202, for example. In this embodiment the rod 222 is a hollow steel tube, and it defines an alignment portion 224 at one end. The centerline of the rod 222 is aligned with an axis 226. Alternately, the rod 222 may be a solid or a partially drilled solid element.

A strengthening element 228 is mounted around the ball 204. This strengthening element 228 includes a first portion 230 which is generally annular in shape and extends generally parallel to the axis 226 around a portion of the ball 204. The strengthening element 228 also includes a second portion 232 which extends radially inwardly from the first portion 230 toward the ball 204.

The illustrated end of the rod 222, the cap 214, the strengthening element 228 and a portion of the ball 204 are all molded in place in a molded body or housing 234. After the molded body 234 has been formed, a flexible plastic or elastomeric boot 236 is secured between the molded body 234 and the nut 212 by rings 238, 240, respectively. The rings may be formed of steel or a suitable elastomer such as urethane.

The ball stud link 200 has been designed for ease of fabrication, and is preferably formed as follows. The cap 214 is assembled with the rod 222 by press-fitting the annular stem 218 in the tubular alignment portion 224 of the rod 222. The external taper 220 facilitates this press-fit assembly.

Either before or after the cap 214 is assembled with the rod 222, the ball 204 is press-fit in the recess 216 of the cap 214. If desired, the grease 210 is placed in the cavity 208 prior to assembly of the ball 204 in the cap 214.

The ball stud 202, the cap 214 and the rod 222 form a self-supporting sub-assembly which is easily positioned in a mold and which holds itself together during the molding operation. This sub-assembly is held together by the press-fit between the alignment portions 218, 224 and by the snap fit between the ball 204 and the cap 214.

This sub-assembly can then be placed within a mold (not shown), and the features described above ensure adequate alignment of the component parts of the sub-assembly. The strengthening element 228 may not be required in all applications. If it is required, the strengthening element 228 is installed on the ball stud 202 prior to the time the mold is closed. Then a plastic material is injected into the mold to surround the end portion of the rod 222, the cap 214, the strengthening element 228, and a portion of the ball 204. This plastic material forms the molded body or housing 234 and provides structural strength, securely interconnecting the embedded elements.

Either before or after the molding operation, the nut 212 is threaded on the stud 206. The boot 236 and the rings 238, 240 are then installed to complete assembly of the ball stud link 200.

The alignment portions on the cap 214 and the rod 222 ensure proper alignment during the molding process, and reduce the complexity of the fixturing required to maintain the sub-assembly in proper position in the mold.

Of course, it will be recognized that a wide variety of changes and modifications can be made to the preferred embodiment described above. The rod does not have to be tubular, and if it is tubular adjacent the cap it may form other cross-sectional configurations at other portions along its length.

Additionally, the alignment portions on the cap and the rod may be shaped differently. For example, the annular stem can fit around the exterior of the rod. If the rod has a solid end, the alignment portion on the rod can be formed as one or more protruding elements of various shapes, or as one or more recesses of various shapes. For example, various posts, blades and other configurations can be used for the alignment portion of the rod. Complementary alignment portions are then provided on the cap.

The ball stud may be formed in many ways, and if desired the ball may be formed without the cavity 208. Similarly, the ball may be formed as a separate part which is molded on or assembled to the stud.

A wide variety of materials can be used for the elements described above. For example, the cap 214 can be formed of a moldable plastic material such as a glass filled nylon. DuPont resin 70G33 has been found suitable. Alternately an acetal resin such as that supplied by DuPont under the trade name Delrin may be used. Similar materials can be used for the molded body 234. The strengthening element 228 can be provided with openings as described in co-pending U.S. patent application Ser. No. 08/509,806, filed Aug. 1, 1995 and assigned to the assignee of the present invention. This co-pending application is hereby incorporated by reference in its entirety. The remaining elements can be formed of conventional materials.

In view of the many changes possible to the ball joint link described above, it is intended that the foregoing description be regarded as illustrative rather than limiting, and that it be understood that it is the following claims, including all equivalents, which are intended to define the scope of this invention.

We claim:

1. A ball joint link comprising:

a ball stud comprising a stud which supports a ball;

a cap mounted on the ball and comprising one of an alignment stem portion and an alignment extension portion;

a rod comprising the other of said alignment stem portion and said alignment extension portion; the alignment extension portion receiving and engaging the alignment stem portion;

a molded body formed around at least a portion of the ball, the cap, and the rod to form a ball joint in which the cap is substantially embedded in the molded body, said molded body formed around the alignment stem portion and the alignment extension portion; and a strengthening element disposed around the ball stud and insert molded within the body such that a portion of the body extends radially inwardly of the strengthening element, between the cap and the strengthening element, said strengthening element comprising a first portion sized to receive at least part of the ball to hold the ball in the ball joint, said strengthening element further comprising a second portion extending radially inwardly from the first portion.

2. The ball joint link of claim 1 wherein the rod comprises a tubular portion, wherein the alignment extension portion comprises an end of the tubular portion that receives the alignment stem portion; and wherein the alignment stem portion is shaped to fit within the alignment extension portion.

3. The ball joint link of claim 2 wherein the alignment stem portion is annular in shape.

4. The ball joint link of claim 3 wherein the alignment stem portion forms an external taper in a rest state, prior to insertion into the tubular portion.

5. The ball joint link of claim 1 wherein the stud is oriented along an axis defined by the rod when the ball stud is centered in the ball joint.

6. The ball joint link of claim 1 wherein the cap receives the ball in a snap fit.

7. The ball joint link of claim 1 wherein the rod extends outwardly from the molded body, and wherein the rod is configured to transmit mounting forces to the molded body.

8. The ball joint link of claim 1 wherein the rod and the stud extend outwardly from the molded body by respective first and second distances, and wherein first distance is at least as great as the second distance.

9. The ball joint of claim 1 wherein the stud and the rod extend substantially outside of the molded body on opposed sides of the ball.

10. The ball joint link of claim 1 wherein the molded body surrounds and is in direct load-bearing contact with both the rod and the cap.

11. The ball joint link of claim 10 wherein the rod forms a shaft that extends substantially outside the molded body.

12. The ball joint link of claim 1 wherein the cap comprises a moldable plastic material, wherein the strengthening element is formed separately from the cap.

13. The ball joint link of claim 1 wherein the second portion of the strengthening element extends closer to the stud than does the cap.

* * * * *